United States Patent
Ito

(10) Patent No.: US 10,375,276 B2
(45) Date of Patent: Aug. 6, 2019

(54) COLOR CORRECTION TABLE CREATION METHOD, COLOR CORRECTION TABLE CREATION APPARATUS, AND NON-TRANSITORY COMPUTER READABLE MEDIUM FOR STORING PROGRAM

(71) Applicant: SEIKO EPSON CORPORATION, Tokyo (JP)

(72) Inventor: Takashi Ito, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/085,047

(22) PCT Filed: Mar. 7, 2017

(86) PCT No.: PCT/JP2017/009033
§ 371 (c)(1),
(2) Date: Sep. 14, 2018

(87) PCT Pub. No.: WO2017/159460
PCT Pub. Date: Sep. 21, 2017

(65) Prior Publication Data
US 2019/0109963 A1    Apr. 11, 2019

(30) Foreign Application Priority Data
Mar. 17, 2016   (JP) ................................ 2016-053267

(51) Int. Cl.
*H04N 1/60*    (2006.01)
*B41J 2/525*   (2006.01)
(Continued)

(52) U.S. Cl.
CPC ............... *H04N 1/60* (2013.01); *B41J 2/525* (2013.01); *G06T 1/00* (2013.01); *H04N 1/46* (2013.01); *H04N 1/6008* (2013.01)

(58) Field of Classification Search
None
See application file for complete search history.

(56) References Cited

U.S. PATENT DOCUMENTS 5,382,968 A * 1/1995 Endoh .................... G06K 15/00
                                                    347/112
5,398,121 A * 3/1995 Kowalewski ........ H04N 1/6019
                                                    358/504
(Continued)

FOREIGN PATENT DOCUMENTS

EP        2899964 A2    1/2015
JP    2004-140577 A     5/2004
(Continued)

*Primary Examiner* — Anh-Vinh T Nguyen

(57) ABSTRACT

A color correction table creation method for creating a color correction table for correcting a device-dependent value used as printing data to be input to a printing apparatus, including an output value acquisition step of acquiring, as an output value, a colorimetric result for a printed matter created by inputting a specific device-dependent value to the printing apparatus, an input value acquisition step of acquiring, as an input value for the color correction, a device-dependent value for a printed matter created by a reference printing apparatus to achieve the output value acquired, a correction value acquisition step of acquiring the specific device-dependent value as a correction value corresponding to the input value, and a creation step of creating the color correction table utilizing a relationship between the input value and the correction value.

7 Claims, 15 Drawing Sheets

(51) Int. Cl.
*G06T 1/00* (2006.01)
*H04N 1/46* (2006.01)

(56) References Cited

U.S. PATENT DOCUMENTS

| | | | |
|---|---|---|---|
| 6,697,582 B1* | 2/2004 | Scheuer | G03G 15/01 399/49 |
| 7,417,762 B2* | 8/2008 | Arai | H04N 1/6033 345/591 |
| 2002/0196472 A1* | 12/2002 | Enomoto | G06T 5/006 358/3.26 |
| 2003/0043394 A1* | 3/2003 | Kuwata | H04N 1/46 358/1.9 |
| 2004/0234127 A1 | 11/2004 | Arai et al. | |
| 2004/0263879 A1 | 12/2004 | Ito et al. | |
| 2004/0263880 A1 | 12/2004 | Ito et al. | |
| 2004/0263881 A1 | 12/2004 | Ito et al. | |
| 2004/0263882 A1 | 12/2004 | Ito et al. | |
| 2005/0041038 A1* | 2/2005 | Sanger | G03G 15/0115 345/612 |
| 2005/0094169 A1 | 5/2005 | Berns et al. | |
| 2005/0094871 A1 | 5/2005 | Berns et al. | |
| 2005/0146737 A1 | 7/2005 | Ono | |
| 2006/0176529 A1 | 8/2006 | Ito et al. | |
| 2006/0193018 A1 | 8/2006 | Ito et al. | |
| 2007/0003136 A1* | 1/2007 | Shimbaru | H04N 1/6058 382/167 |
| 2007/0019013 A1* | 1/2007 | Tamura | B41J 2/04521 347/9 |
| 2007/0030505 A1 | 2/2007 | Ito et al. | |
| 2007/0070367 A1* | 3/2007 | Keydar | H04N 1/6033 358/1.9 |
| 2009/0251715 A1* | 10/2009 | Kita | G03G 15/01 358/1.9 |
| 2009/0310157 A1* | 12/2009 | Wada | H04N 1/6058 358/1.9 |
| 2010/0208304 A1* | 8/2010 | Murase | G06T 11/001 358/3.26 |
| 2011/0051208 A1* | 3/2011 | Hirano | H04N 1/6019 358/518 |
| 2011/0249280 A1 | 10/2011 | Ito | |
| 2012/0218574 A1* | 8/2012 | Fukuda | H04N 1/6033 358/1.9 |
| 2018/0160015 A1* | 6/2018 | Ito | H04N 1/6005 |
| 2018/0324327 A1* | 11/2018 | Moribe | H04N 1/60 |
| 2018/0376030 A1* | 12/2018 | Yamashita | H04N 1/00023 |

FOREIGN PATENT DOCUMENTS

| | | |
|---|---|---|
| JP | 2004-140578 A | 5/2004 |
| JP | 2004-320624 A | 11/2004 |
| JP | 2004-320625 A | 11/2004 |
| JP | 2004-320626 A | 11/2004 |
| JP | 2004-320627 A | 11/2004 |
| JP | 2005-178180 A | 7/2005 |
| JP | 2006-197080 A | 7/2006 |
| JP | 2006-217150 A | 8/2006 |
| JP | 2007-043488 A | 2/2007 |
| JP | 2007-511161 A | 4/2007 |
| JP | 2007-516663 A | 6/2007 |
| JP | 2007-221645 A | 8/2007 |
| JP | 2008-060637 A | 3/2008 |
| JP | 2009-033239 A | 2/2009 |
| JP | 2009-188657 A | 8/2009 |
| JP | 2010-245966 A | 10/2010 |
| JP | 2011-223345 A | 11/2011 |
| JP | 2011-223392 A | 11/2011 |
| JP | 2011-223434 A | 11/2011 |
| JP | 2012-129905 A | 7/2012 |
| JP | 2012-217075 A | 11/2012 |
| JP | 2015-139179 A | 7/2015 |
| JP | 2015-142250 A | 8/2015 |
| WO | 2005/043884 A1 | 5/2005 |
| WO | 2005/043885 A1 | 5/2005 |

* cited by examiner

| DEVICE-DEPENDENT VALUES | DEVICE-INDEPENDENT VALUES (OUTPUT VALUES) |
|---|---|
| C  M  Y  K | L*  a*  b* |
| $C_0$ $M_0$ $Y_0$ $K_0$<br>$C_1$ $M_1$ $Y_1$ $K_1$<br>⋮ | $L^*_0$ $a^*_0$ $b^*_0$<br>$L^*_1$ $a^*_1$ $b^*_1$<br>⋮ |

Fig. 2

$$B = \begin{bmatrix} \frac{1}{x_1-x_0} & -\frac{x_2-x_0}{(x_2-x_1)(x_1-x_0)} & \cdots & & & 0 \\ & \frac{1}{x_2-x_1} & \ddots & & & \\ & & \frac{1}{x_i-x_{i-1}} & -\frac{x_{i+1}-x_{i-1}}{(x_{i+1}-x_i)(x_i-x_{i-1})} & \cdots & \\ & & & \frac{1}{x_{i+1}-x_i} & \ddots & \\ & & & & \frac{1}{x_{n-2}-x_{n-3}} & -\frac{x_{n-1}-x_{n-3}}{(x_{n-1}-x_{n-2})(x_{n-2}-x_{n-3})} \\ 0 & & & & & \frac{1}{x_{n-1}-x_{n-2}} \end{bmatrix} \quad \cdots (6)$$

Fig. 7

| INPUT VALUE | CORRECTION VALUE |
|---|---|
| $b'_0$ | $b_0$ |
| ⋮ | ⋮ |
| $b'_i$ | $b_i$ |
| ⋮ | ⋮ |
| $b'_{n-1}$ | $b_{n-1}$ |

Fig. 8

COLOR CORRECTION TABLE CREATION METHOD, COLOR CORRECTION TABLE CREATION APPARATUS, AND NON-TRANSITORY COMPUTER READABLE MEDIUM FOR STORING PROGRAM

CROSS-REFERENCE TO RELATED APPLICATIONS

This application claims priority under 35 U.S.C. § 119 to Japanese Patent Application No. 2016-053267, filed Mar. 17, 2016. The entire disclosure of Japanese Patent Application No. 2016-053267 is hereby incorporated herein by reference.

TECHNICAL FIELD

The present invention relates to creation of a color correction table.

BACKGROUND ART

JP-A-2005-178180 discloses a technique for creating a color correction table in accordance with the following steps. First, in a first step, a prescribed color patch is printed based on patch image data used to print a plurality of patches with a gradation value varied for each ink color used in a printing apparatus.

In a second step, the printed color patches are measured and color values for the color patches are acquired. In a third step, with reference to the acquired color values, color values corresponding to all the gradation values in a color correction table are acquired through interpolation using a specific function.

In a fourth step, the color values acquired through interpolation and corresponding to all the gradation values are compared with standard values that are color values in standard printing results, and based on results of the comparison, a color correction table used to correct color image data is created to allow the printing apparatus to produce a printing result equivalent to a standard printing result corresponding to color image data with any gradation value.

SUMMARY

In the above-described related art, a color correction table is created independently for each ink color to use. In this case, errors in a mixed color area may not sufficiently be corrected. Furthermore, in a case where an attempt is made to interpolate colorimetric results in the mixed color area as in the above-described related art, interpolation accuracy as accurate as that in the case of monochromatic colorimetry may not be expected unless the number of measured colors is exponentially increased with respect to the number of measured colors in the monochromatic colorimetry.

In view of the above, an advantage of the invention of the present application is to generate a color correction table allowing accurate correction to be achieved in a mixed color area even with a small number of measured colors.

The present invention accomplishes this advantage and is realized in the following aspects.

An aspect of the present invention provides a color correction table creation method for creating a color correction table for correcting a device-dependent value used as printing data to be input to a printing apparatus, the color correction table creation method including an output value acquisition step of acquiring, as an output value, a colorimetric result for a printed matter created by inputting a specific device-dependent value to the printing apparatus, an input value acquisition step of acquiring, as an input value for the color correction, a device-dependent value for a printed matter created by a reference printing apparatus to achieve the output value acquired, a correction value acquisition step of acquiring the specific device-dependent value as a correction value corresponding to the input value, and a creation step of creating the color correction table utilizing a relationship between the input value and the correction value. This aspect allows an accurate relationship to be established between the input value and the correction value, even with a small number of measured colors. This is because a value with few errors is acquired for both input value and correction value. The correction value is input during the output value acquisition step and thus involve no errors. The few errors in the input value are due to utilization of characteristics of the reference printing apparatus during the input value acquisition step. The characteristics of the reference printing apparatus may be predetermined for a large number of combinations of characteristics. Therefore, even in a case where interpolation or the like is implemented, the interpolation is achieved with high accuracy, resulting in reduced magnitudes of errors.

In the above-described aspect, the method may further include a supplementation step of supplementing the relationship between the input value and the correction value, and in the creation step, the correction value may be determined by utilizing a result of the supplementation for at least some of a plurality of input values to be stored in the color correction table. This aspect allows the color correction table to be created with high accuracy even with a small number of measured colors.

In the above-described aspect, a spline function may be used in the supplementation step. This aspect allows the color correction table to be created with higher accuracy than above by using the spline function.

In the above-described aspect, the input value may be determined to minimize a sum of squares of second differential parameters at lattice points of a cubic spline function used in the supplementation step. According to this aspect, the input value to be determined is smoothed to enhance correction accuracy.

In the above-described aspect, the cubic spline function used in the supplementation step may include first to n-th spline functions (n is an integer of 2 or greater) respectively defined by first to n-th directions orthogonal to one another, and the input value may be determined to minimize a value of a sum acquired by calculating and summing, for combinations for the first to n-th directions and for all the lattice points, a square of a difference between a second differential parameter at a certain lattice point of the spline function for an m-th (m is any one of integers of 1 to n) direction and a second differential spline parameter at an adjacent lattice point of another spline function for the m-th direction, the another spline function for the m-th direction passing through the adjacent lattice point that is adjacent to the certain lattice point in a direction orthogonal to the m-th direction. This aspect makes input values in adjacent directions close to each other to enhance correction accuracy.

In the above-described aspect, the device-dependent value used as the printing data may be defined to be n-dimensional (n is an integer of 2 or greater), and in the input value acquisition step, among candidates for the input value, a value with a shortest distance to the specific device-dependent value in the n-dimensional space may be acquired as the input value. This aspect allows a value to be restrained from changing significantly between before correction and after correction.

In the above-described aspect, the method may further include a colorimetric apparatus correction step of correcting a deviation between a characteristics of the reference colorimetric apparatus and a characteristics of a colorimetric apparatus used for colorimetric processing on the printed matter in the input value acquisition step, and in the input value acquisition step, the input value may be acquired using a correspondence relationship between the device-dependent value and the output value acquired in the colorimetric apparatus correction step. This aspect allows errors in the colorimetric apparatus to be corrected.

The present invention may be implemented in various aspects other than the aspects described above. For example, the present invention may be realized in aspects such as an apparatus implementing the above-described method, a program for implementing the method, or a non-transitory storage medium for storing the program.

BRIEF DESCRIPTION OF DRAWINGS

FIG. 2 is a diagram illustrating an A2B table.
FIG. 7 is a diagram illustrating Equation (6) representing a matrix B.
FIG. 8 is a diagram illustrating a color correction table.

DESCRIPTION OF EXEMPLARY EMBODIMENTS

Figure 1:
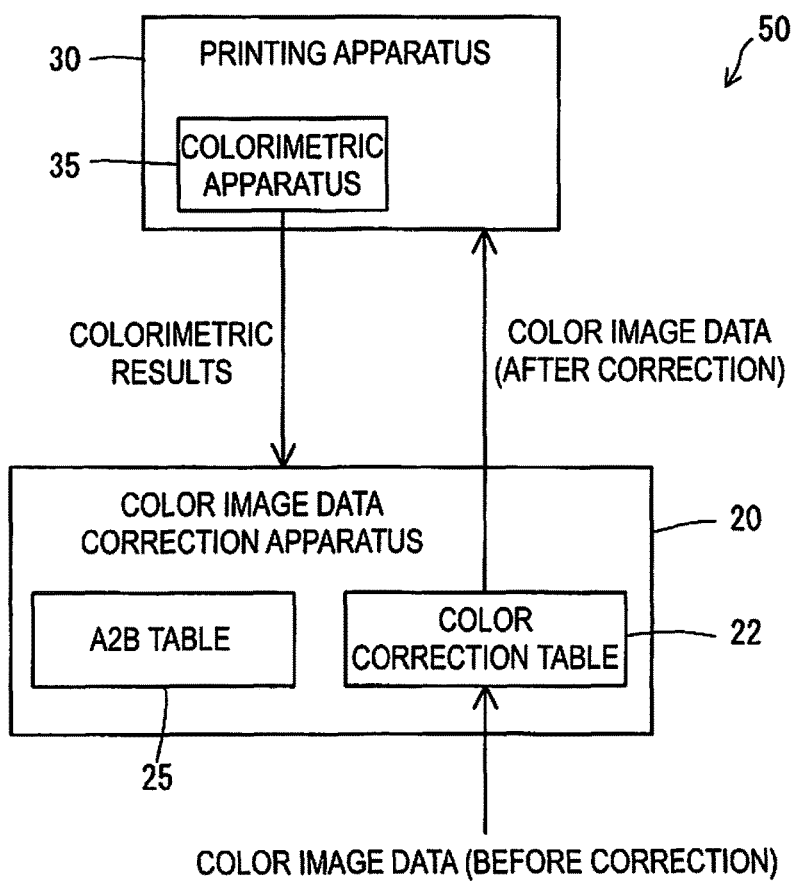
FIG. 1 is a block diagram illustrating a printing system.

FIG. 1 is a block diagram illustrating a printing system 50. The printing system 50 includes a color image data correction apparatus 20 (hereinafter referred to as a correction apparatus 20) and a printing apparatus 30.

The printing apparatus 30 performs printing in accordance with multilevel color image data as input color image data. The multilevel color image data is represented by device-dependent values and specifically described as combinations of values (0 to 255) for cyan (C), yellow (Y), magenta (M), and black (K). One color value represented by a combination of the four values constitutes one device-dependent value.

The printing apparatus 30 includes a colorimetric apparatus 35. The colorimetric apparatus 35 is capable of executing colorimetric processing on printed matter created by the printing apparatus 30 and printed matter created by any other printing apparatus. Colorimetric results are color values in an Lab color space. The printing apparatus 30 inputs colorimetric results to the correction apparatus 20.

The correction apparatus 20 is a computer including an arithmetic apparatus (CPU), a storage apparatus (ROM, RAM, HDD, memory, or the like), an input/output interface, and the like. The correction apparatus 20 corrects color image data to be printed and inputs the resultant data to the printing apparatus 30. The multilevel color image data is represented by device-dependent values and specifically described as combinations of values (0 to 255) for cyan (C), yellow (Y), magenta (M), and black (K).

A color correction table 22 is used for the above-described correction. The color correction table 22 is a lookup table (LUT) created for each printing apparatus 30 by utilizing processing described below. Thus, the correction apparatus 20 is also an apparatus that creates the color correction table 22 (correction table creation apparatus).

To create a color correction table 22, the correction apparatus 20 stores an A2B table 25 defined as an ICC profile and describing device characteristics. FIG. 2 illustrates the A2B table 25. Each device-dependent value is associated with a color value (device-independent value) represented by a device-independent color space. In the exemplary embodiment, the device-independent color space is a Lab color space.

Correspondence relationships in the A2B table 25 are relationships obtained by a reference printing apparatus. The reference printing apparatus is an individual printing apparatus that is different from the printing apparatus 30 and that has reference characteristics. In other words, when the reference printing apparatus causes a colorimetric apparatus included in the reference printing apparatus to execute colorimetric processing on a patch printed using a certain device-dependent value, values associated with the device-dependent value including L*, a*, and b* are measured.

The A2B table 25 describes a large number of combinations of device-dependent values and device-independent values. A large number means a significantly large number of combinations compared to the number of combinations of device-dependent values and device-independent values (colorimetric values) acquired in S220 described below.

Figure 3:
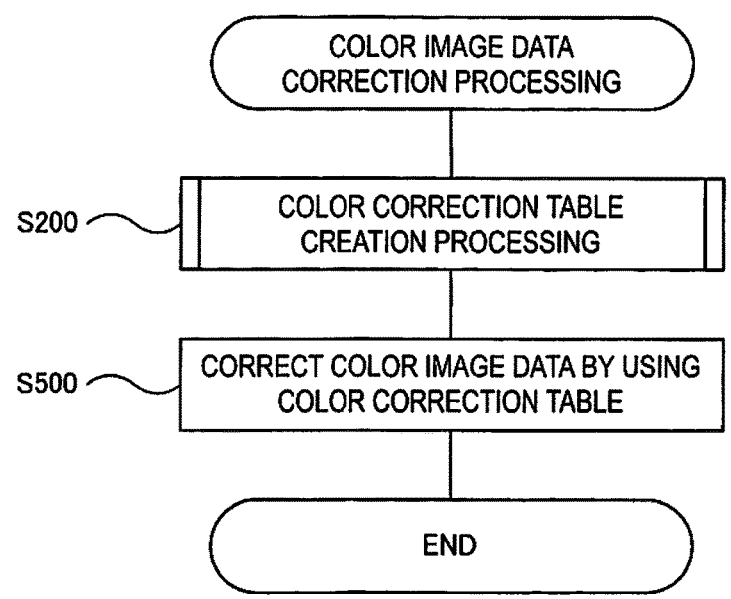
FIG. 3 is a flowchart illustrating color image data correction processing.

FIG. 3 is a flowchart illustrating color image data correction processing. The correction apparatus 20 implements the color image data correction processing by executing a program stored in a storage medium. First, to create the color correction table 22, color correction table creation processing is executed (S200).

Figure 4:
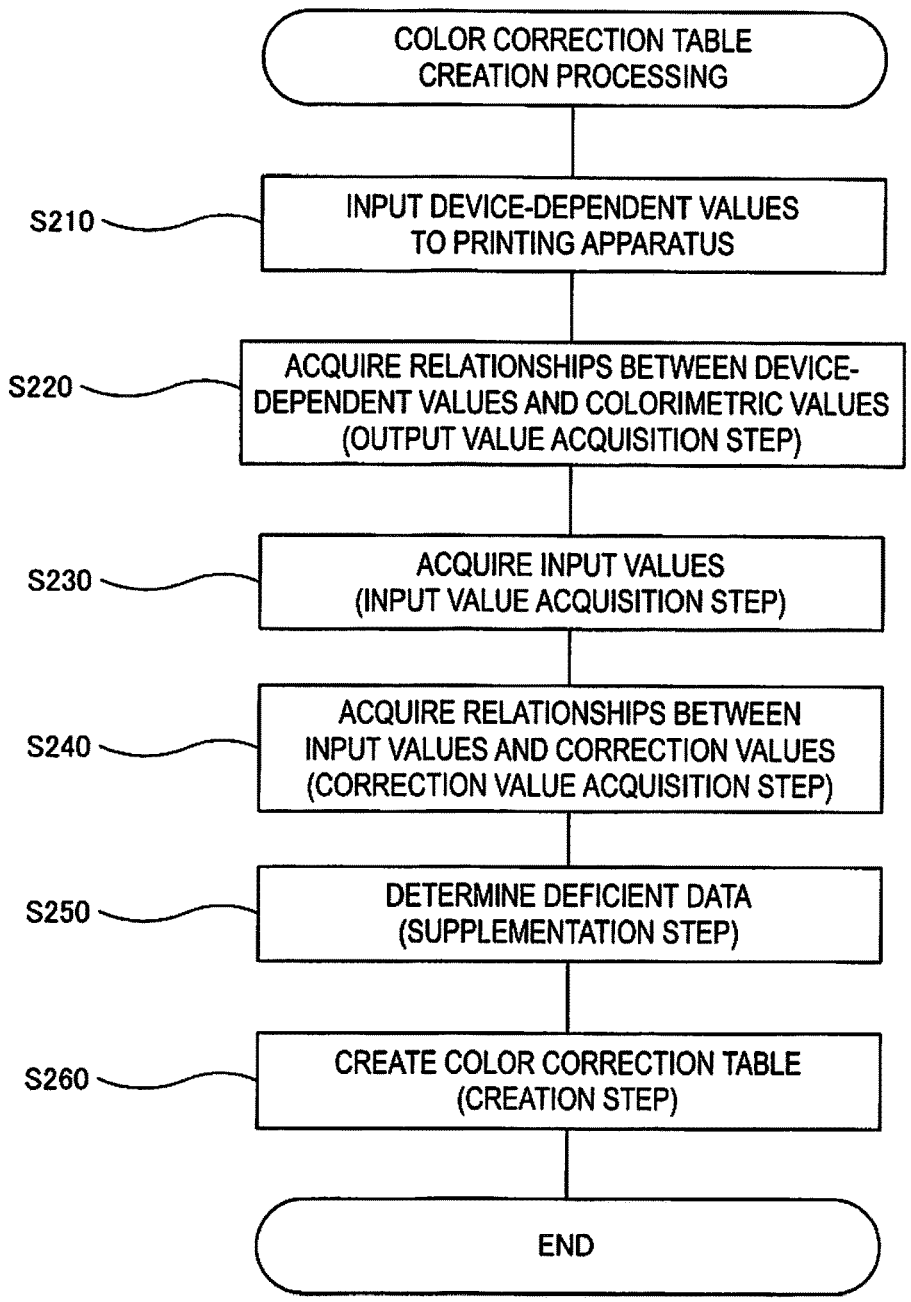
FIG. 4 is a flowchart illustrating color correction table creation processing.

FIG. 4 is a flowchart illustrating the color correction table creation processing. First, specific device-dependent values are input to the printing apparatus 30 (S210). A plurality of device-dependent values are input in S210, and which device-dependent values are input is predetermined.

Then, combinations of device-dependent values and colorimetric values are acquired from the printing apparatus 30 (S220) (output value acquisition step). The printing apparatus 30 uses the device-dependent values input in S210 to print patches for the respective colors. The printing apparatus 30 causes the colorimetric apparatus 35 to execute colorimetric processing on the patches and inputs colorimetric values to the correction apparatus 20. The input colorimetric values are associated with the device-dependent values serving as sources for printing of the patches. In this manner, S220 is executed.

Then, input values (described below) are acquired (S230) (input value acquisition step), and subsequently, relationships between the input values and correction values (described below) are acquired (S240) (correction value acquisition step). S230 and S240 will be described below in detail.

Figure 5:
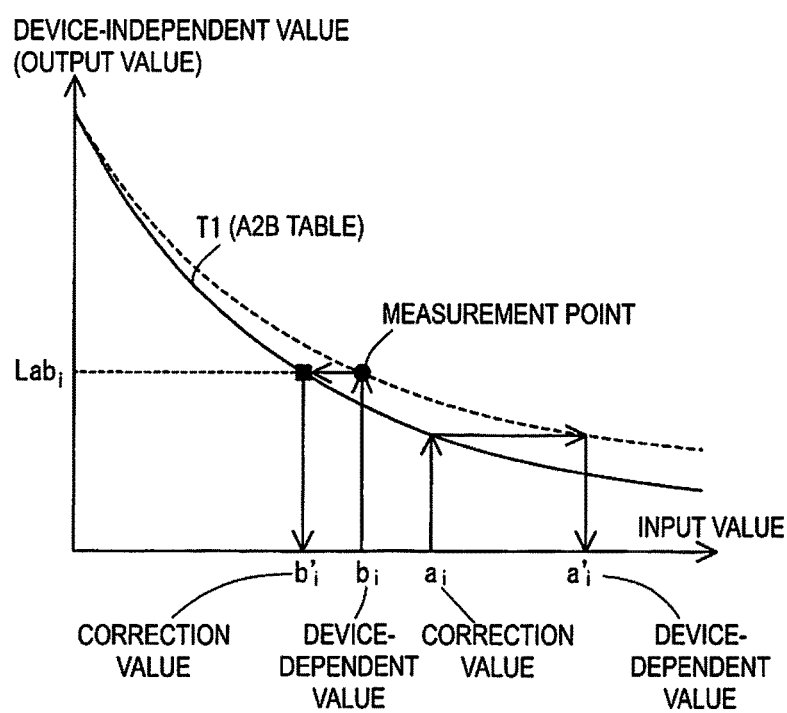
FIG. 5 is a graph illustrating relationships between output values and device-dependent values.

FIG. 5 is a graph illustrating relationships between output values (color values of device-independent values) and device-dependent values. In FIG. 5, the Lab color space, which is three-dimensional, and device-dependent values, which are four-dimensional, are each treated as one-dimensional.

A measurement point ($b_i$, $Lab_i$) illustrated in FIG. 5 is one of the correspondence relationships acquired in S220. In other words, the measurement point indicates that an output value $Lab_i$ results from measurement, performed by the colorimetric apparatus 35, of the color of printed matter printed by the printing apparatus 30 in accordance with a device-dependent value $b_i$.

FIG. 5 indicates a relationship T1 defined in the A2B table 25. The measurement point illustrated in FIG. 5 deviates from the relationship defined in the A2B table 25. In other words, printing by the printing apparatus 30 results in color deviation.

On the other hand, a value on the horizontal axis corresponding to an intersection point between the output value $Lab_i$ and the relationship T1 is a device-dependent value $b'_i$. In other words, the A2B table stores the device-dependent value $b'_i$ and the output value $Lab_i$ in association with each other. Therefore, in a case where a printing result based on the output value $Lab_i$ is to be obtained using the printing apparatus 30, the device-dependent value $b_i$ may simply be input to the printing apparatus 30 instead of the device-dependent value $b'_i$.

The input value hereinafter refers to a device-dependent value resulting from the colorimetric result and the relationship T1 as described above. In other words, the device-dependent value allowing the output value acquired in S220 to be realized by the printed matter created by the reference printing apparatus is acquired as an input value in the color correction table 22.

Note that, in a case where the A2B table 25 does not store the output value $Lab_i$, the input value is obtained using interpolation. The interpolation is implemented with high accuracy. This is because the number of output values in the A2B table 25 is greater than the number of measured colors acquired in S220, leading to a short distance between lattice points. In S230, the input value is obtained as described above.

The correction value refers to a device-dependent value input in S210 as a value corresponding to the acquired input value. The correction value corresponding to the input value $b'_i$ is the correction value $b_i$.

A known generation method for a color correction table such as the above-described related art is a technique for determining a correction value $a_i'$ corresponding to an input value $a_i$ in a table corresponding to the A2B table defining the target color value, as indicated by the device-dependent values $a_i$ and $a_i'$ in FIG. 5. This technique determines the correction value through the interpolation using the relationship between the value input in S210 and the colorimetric value acquired in S220. However, interpolation with high accuracy for color correction corresponding to the above-described color mixture is difficult to achieve from a practical, small number of colorimetric points.

In S240, for all the relationships acquired in S220, the relationships between the input values and the correction values are acquired. Here, the acquired relationships between the input values and the correction values may not necessarily involve all the data in the color correction table 22. Deficient data is determined in S250 described below.

Then, the deficient data (the relationships between the input values and the correction values) is determined (S250) (supplementation step). The deficient data refers to correspondence relationships between input values and correction values that are the correspondence relationships to be stored in the color correction table 22 and that have failed to be acquired in S240 (correction value acquisition step).

Figure 6:
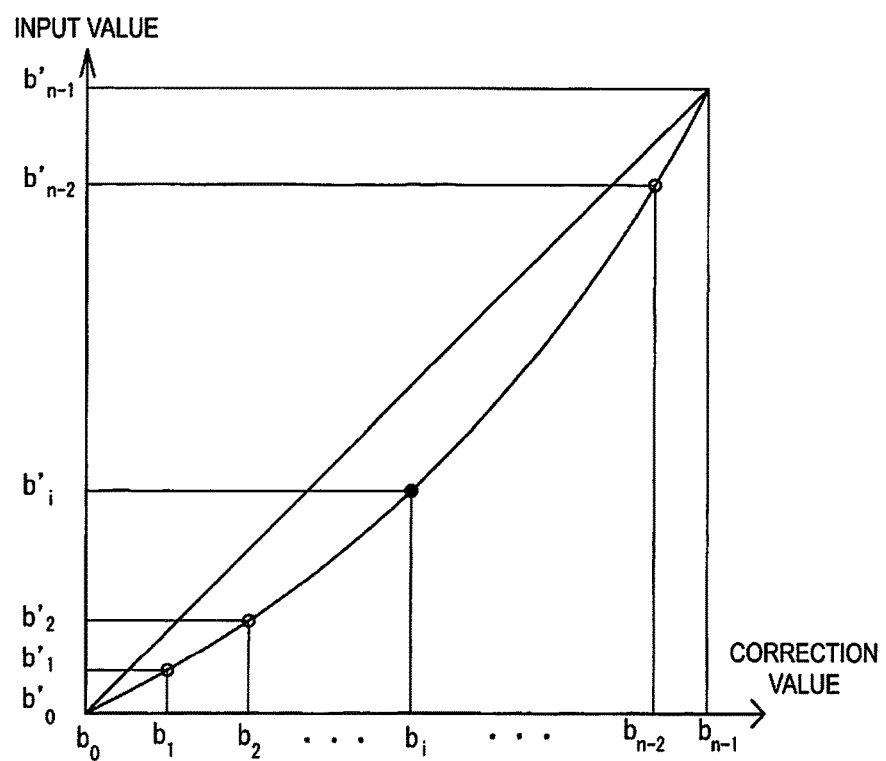
FIG. 6 is a graph for describing a supplementation step of supplementing deficient data.

FIG. 6 is a graph for describing a supplementation step of supplementing the deficient data. In FIG. 6, the vertical axis indicates the input value, and the horizontal axis indicates the correction value. As described above, combinations of the correction values $b_i$ and the input values $b'_i$ as measurement points are known and thus provided as initial values. In the present embodiment, the number of data items in the color correction table is assumed to be n, and a correction value $b_0$ and a correction value $b_{n-1}$ are respectively provided for an input value $b'_0$ and an input value $b'_{n-1}$, which correspond to end points. The correction value $b_0$ is equal to the input value $b'_0$, and the correction value $b_{n-1}$ is equal to the input value $b'_{n-1}$.

The supplementation step determines the deficient data using a cubic spline function (hereinafter simply referred to as the "spline function").

Here, an independent variable x of the spline function corresponds to the above-described correction value, and a dependent variable y of the spline function corresponds to the above-described input value. Furthermore, data constituting the spline function is determined such that the data meets the following two conditions to supplement the deficient data. A first condition is that the data passes through already determined points. In other words, the data passes through ($b_0$, $b'_0$), ($b_i$, $b'_i$) and ($b_{n-1}$, $b'_{n-1}$). A second condition is that the sum of the squares of second differential parameters y" for the input values (dependent variable) at the respective correction values (independent variable) is minimized. The second condition is intended to smooth the spline function. Furthermore, a supplementary condition is that the second differential parameters y" for the end points x=$b_0$, $b_{n-1}$ are zero. The supplementary condition does not necessarily involve setting the second differential parameter y" to zero, and thus, any value may be specified. However, setting the second differential parameter y" to zero is most general. Determining the deficient data under these conditions allows determination of the correspondence relationships between all the input values and all the correction values.

The description of the above-described second condition will be supplemented. When a matrix A and a matrix B are used for the second differential parameter y", Equation (1) below is satisfied.

$$Ay''=By \quad (1)$$

Therefore, this allows the second differential parameter y" to be determined by the following equation.

$$y''=A^{-1}By \quad 2)$$

The above-described y and y" are represented by the following equations.

$$y=[y_0 \ldots y_i \ldots y_{n-1}]^T \quad (3)$$

$$y''=[y''_1 \ldots y''_i \ldots y''_{n-2}]^T \quad (4)$$

As described above, in a case where the spline function is defined to include n elements, the vector y is a vector including, as elements, dependent variables of the spline function. The vector y" includes n−2 elements that are second differential values corresponding to the elements of the vector y. The reason why the number of elements of the vector y" is smaller by two than the number of elements of the vector y is that each of the first and last elements has a value fixed to zero under the above-described supplementation conditions ($y''_0 = y''_{n-1} = 0$).

The matrix A is as follows. The matrix B is as illustrated in FIG. 7. The matrix A is a tridiagonal matrix with n−2 rows and n−2 columns. The matrix B includes n−2 rows and n columns and is not a square matrix. However, the matrix B includes a structure similar to the structure of a tridiagonal matrix.

[Mathematical Equation 1]

$$A = \begin{bmatrix} \frac{x_2-x_0}{3} & \frac{x_2-x_1}{6} & & & & & 0 \\ \frac{x_2-x_1}{6} & \frac{x_3-x_1}{3} & \frac{x_3-x_2}{6} & & & & \\ & \ddots & \ddots & \ddots & & & \\ & & \frac{x_i-x_{i-1}}{6} & \frac{x_{i+1}-x_{i-1}}{3} & \frac{x_{i+1}-x_j}{6} & & \\ & & & \ddots & \ddots & \ddots & \\ & & & & \frac{x_{n-3}-x_{n-4}}{6} & \frac{x_{n-2}-x_{n-4}}{3} & \frac{x_{n-2}-x_{n-3}}{6} \\ 0 & & & & & \frac{x_{n-2}-x_{n-3}}{6} & \frac{x_{n-1}-x_{n-3}}{3} \end{bmatrix} \quad (5)$$

Among the elements of the vector y, a vector including elements with known relationships between the input values and the correction values is denoted by $y_k$, and a vector including elements with an unknown correction relationship is denoted by $y_u$. In the matrix B, a matrix including column elements corresponding to the vector $y_k$ is denoted by $B_k$, and a matrix including column elements corresponding to the vector $y_u$ is denoted by $B_u$. In this case, Equation (2) may be converted into Equation (7).

$$y'' = A^{-1} B_u y_u + A^{-1} B_k y_k \quad (7)$$

Here, in a case where $y_u$ is determined that results from minimization of the square sum of the elements of the second differential parameter y", the smoothest data column y as defined by the spline function is acquired. In other words, the color correction table 22 is created based on the correspondence relationships between the smoothly supplemented input values and correction values. From above, an objective function for determining the deficient data is represented by Equation (8), and $y_u$ is determined in such a manner as to minimize E. Note that T in Equation (8) represents transposition of a vector (or a matrix).

$$E = y''^T y'' \quad (8)$$

Note that, in the above description, the spline function is defined for only one direction, in other words, the above description relates to a case of one dimension. However, in actuality, the input values and the correction values involve four dimensions for C, M, Y, and K. In the case of such multiple dimensions, the objective function is generated by defining Equation (8) for each direction and adding the results together. Furthermore, in the case of a four-dimensional lattice point structure, a plurality of spline functions may be defined for each of the directions for C, M, Y, and K. However, Equation (8) defined in association with the spline functions is added to the above-described objective function.

The data in the thus supplemented color correction table 22 corresponds to ($b_1$, $b'_1$), . . . , ($b_{i-1}$, $b'_{i-1}$), ($b_{i+1}$, $b'_{i+1}$), . . . , ($b_{n-2}$, $b'_{n-2}$) in FIG. 6.

Subsequently to S250, the results in S250 are used to create the color correction table 22 (S260) (creation step). FIG. 8 is a diagram illustrating the color correction table 22.

Finally, the color image data is corrected using the created color correction table 22 (S500). Specifically, CMYK values input to the correction apparatus 20 as color image data are assumed as input values, and CYMK values are acquired as correction values corresponding to the input values. Thus, the input values are corrected to the correction values. Then, the corrected color image data is input to the printing apparatus 30 to implement printing in the corrected colors.

Exemplary Embodiment 1 allows the relationships between the input values and the correction values to be accurately determined as described with reference to FIG. 5. Moreover, as described with reference to FIG. 6, the second differential parameters of the spline function are taken into account to allow deficient data to be supplemented in such a manner as to smoothly connect the data together. Thus, Exemplary Embodiment 1 is suitable for correction of colors.

Exemplary Embodiment 2 will be described. Description of Exemplary Embodiment 2 is mainly directed to differences from Exemplary Embodiment 1. Therefore, contents not described in Exemplary Embodiment 2 are the same as the corresponding contents of Exemplary Embodiment 1. Exemplary Embodiment 2 is different from Exemplary Embodiment 1 mainly in S230 and S250. Thus, first, S230 (input value acquisition step) will be described.

Figure 9:
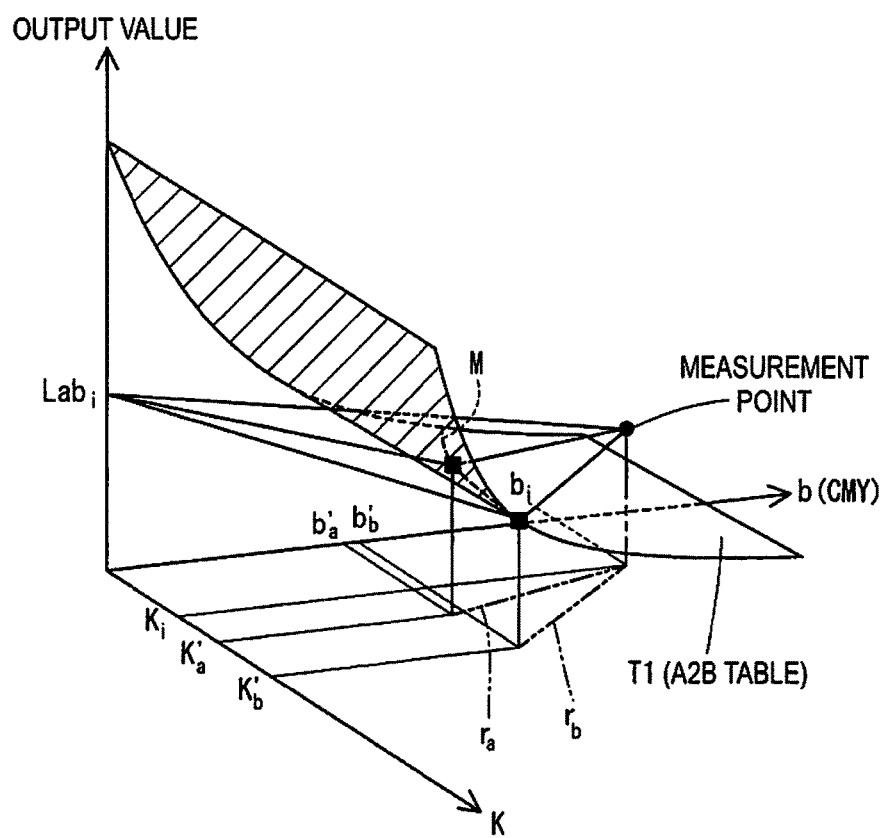
FIG. 9 is a graph illustrating relationships between output values and device-dependent values (Exemplary Embodiment 2).

FIG. 9 is a graph illustrating the relationships between the output values and the device-dependent values. FIG. 9 corresponds to FIG. 5 in the description of Exemplary Embodiment 1. In Exemplary Embodiment 2, the device-dependent values are illustrated as two-dimensional values. The illustrated device-dependent values include K values and b values that are one-dimensional values for C, M, and Y. The relationship T1 defined in the A2B table 25 is expressed as a curved surface. Hatching illustrated in FIG. 9 depicts the back of the curved surface.

The reason why the relationship T1 is schematically illustrated as a curved surface is that the CMYK space is four-dimensional, whereas the Lab space is three-dimensional. In other words, the output values include a smaller number of dimensions than the device-dependent values, and thus, in principle, a plurality of combinations of device-dependent values realizing a certain output value are present. Note that this also applies to Exemplary Embodiment 1, but in Exemplary Embodiment 1, the relationship T1 is schematically illustrated as a curve with the output values and the device-dependent values treated as one-dimensional, allowing the device-dependent values realizing a certain output value to be apparently uniquely determined, for simplification of description.

The output value $Lab_i$ is assumed to have been acquired for a device-dependent value $(b_i, K_i)$ in S220, as is the case with Exemplary Embodiment 1. In this case, in S230, the input value is obtained from the output value $Lab_i$ and the relationship T1. However, since the relationship T1 is expressed as a curved surface, the input value fails to be uniquely determined from the output value $Lab_i$ and the relationship T1. In other words, as illustrated in FIG. 9, the device-dependent value corresponding to any point on a curve M satisfying the output value=$Lab_i$ on the relationship T1 realizes the output value=$Lab_i$. Thus, the input value may be, for example, $(b'_a, K'_a)$ or $(b'_b, K'_b)$ illustrated in FIG. 9.

Figure 10:
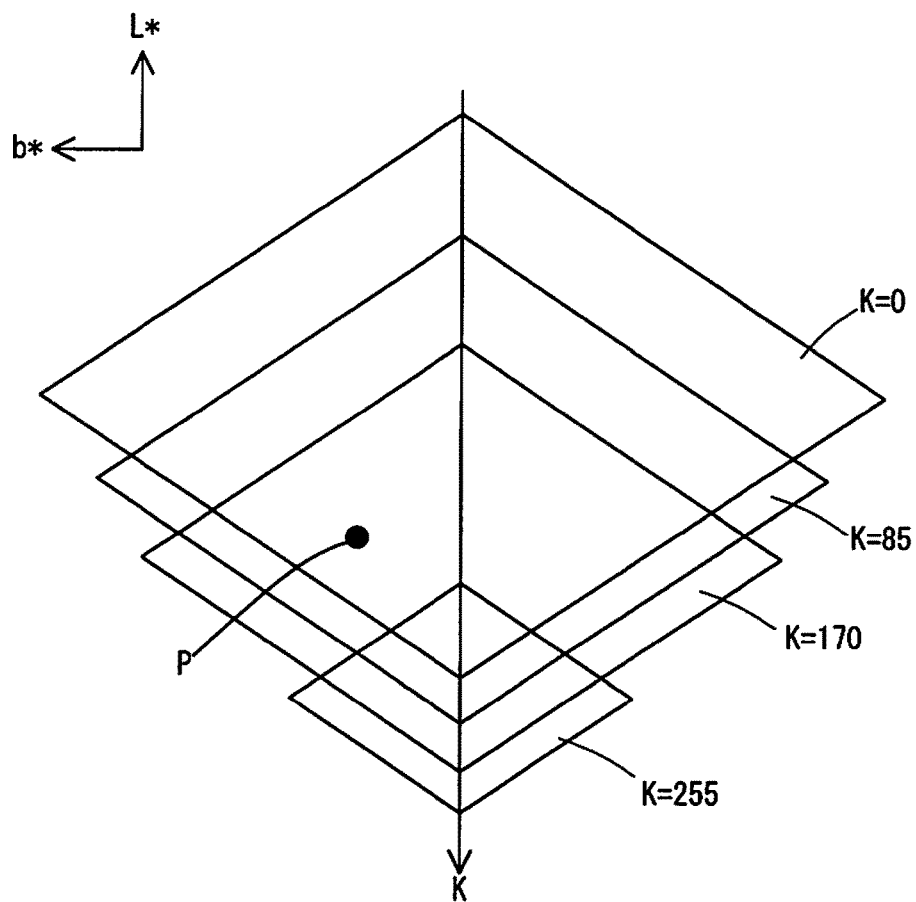
FIG. 10 is a diagram illustrating color value spaces to be reproduced for each K value of lattice point.

The above description of the presence of a plurality of combinations of device-dependent values reproducing the same output value will be supplemented. FIG. 10 illustrates color value spaces to be reproduced for each K value of lattice point. FIG. 10 illustrates examples for only four values of K, i.e., K=0, 85, 170, and 255. In actuality, the color value space is determined for all the K values.

For example, an output value P illustrated in FIG. 10 falls within a reproduction range for K=0, 85, and 170 and falls outside the reproduction range for K=255. According to a general technique, in such a case, first, the K value is determined, and then, the C, M, and Y in the color value space limited by the determined K value are determined. Thus, in the present embodiment, the K value is adopted as an axis in FIG. 9.

As described above, even in a case where a plurality of device-dependent values realize the same output value $Lab_i$, one of the device-dependent values is selected and adopted as an input value to create a color correction table 22. Thus, in the present embodiment, among a plurality of candidates for the input value, the device-dependent value with the shortest distance to the correction value is adopted as the input value. For example, the distance between the correction value $(b_i, K_i)$ and the device-dependent value $(b'_a, K'_a)$ corresponds to a distance $r_a$ illustrated in FIG. 9, and the distance between the correction value $(b_i, K_i)$ and the device-dependent value $(b'_b, K'_b)$ corresponds to a distance $r_b$ illustrated in FIG. 9.

The above-described contents are realized by minimizing an objective function represented by Equation (9).

$$E_2 = |J_b' - J_b|^2 \qquad (9)$$

$J_b$ and $J_b'$ are represented by Equations (10) and (11):

$$J_b = [c_b m_b y_b k_b]^T \qquad (10)$$

$$J_b' = [c_b' m_b' y_b' k_b']^T \qquad (11)$$

where $c_b$ is a cyan value constituting the correction value b, and $c_b'$ is a cyan value constituting the input value b'. This also applies to m (magenta value), y (yellow value), and k (black value). Furthermore, $J_b$ corresponds to the correction value $(b_i, K_i)$ in FIG. 9.

Using the above-described relationship, $E_2$ may be calculated for all the K values for which desired output values fall within the reproduction range, and the minimum value of $E_2$ may be searched for. Alternatively, with $J_b'$ minutely updated, a determination may be made that $E_2$ is minimized when the gradient of $E_2$ is zero. However, the minimum value of $E_2$ is also determined with a constraint that $Lab_i$ is satisfied on the relationship T1.

After the input values are acquired as described above, S240 (correction value acquisition step) is executed as is the case in Exemplary Embodiment 1. Subsequently to S240, S250 (supplementation step) is executed.

Figure 11:
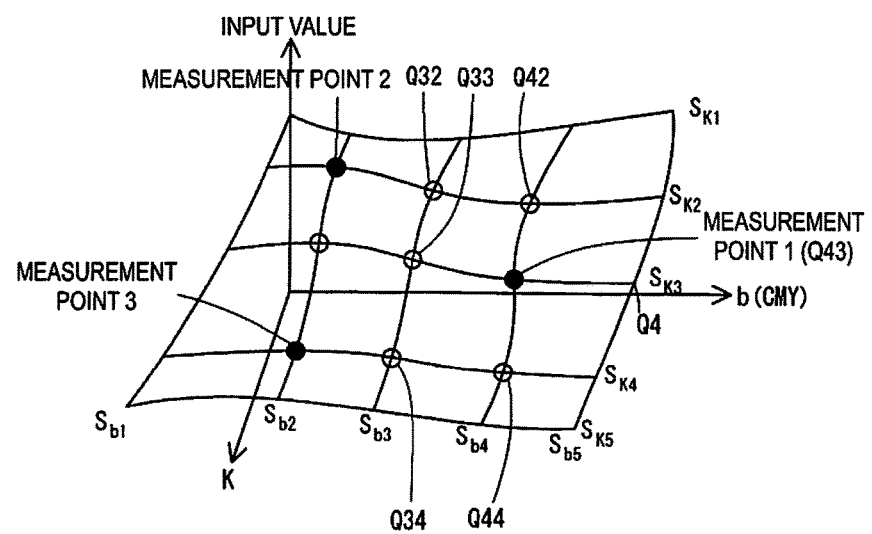
FIG. 11 is a graph for describing a supplementation step of supplementing deficient data (Exemplary Embodiment 2).

FIG. 11 is a graph for describing the supplementation step. The X axis indicates the K value, the Y axis indicates the b value, and the Z axis indicates the input value $(b'_b, K'_b)$. FIG. 11 illustrates 25 lattice points for simplification.

In a case where a lattice structure is two-dimensionally expressed as in FIG. 11, a plurality of spline functions may be defined. Each of the plurality of spline functions is defined based on one of the assumptions that the K value is constant (in other words, the direction of the b value) and that the b value is constant (in other words, the direction of the K value). For spline functions $S_{K1}$ to $S_{K5}$ (first spline functions) illustrated in FIG. 11, the K value is constant. For spline functions $S_{b1}$ to $S_{b5}$ (second spline functions) illustrated in FIG. 11, the b value is constant.

In the present embodiment, each of the spline functions is determined in such a manner as to meet the following two conditions. A first condition is that the data passes through already determined points. Under the first condition, two spline functions orthogonal to each other at a certain correction value $(b_b, K_b)$ assume the same value at the corresponding lattice point.

A second condition is that, for spline functions adjacent to each other in a direction orthogonal to a defined direction, the second differential parameters y" have values as close as possible. By way of example, for spline functions $S_{K3}$ and $S_{K4}$, the value of the second differential parameter y" of the spline function $S_{K3}$ at a lattice point Q33 is as close as possible to the value of the second differential parameter y" of the spline function $S_{K4}$ at a lattice point Q34. This also applies to the second differential parameter of the spline function $S_{K3}$ at the lattice point Q33 and the second differential parameter of a spline function $S_{K2}$ at a lattice point Q32 and to the second differential parameter of a spline function $S_{b3}$ at the lattice point Q33 and the second differential parameter of a spline function $S_{b4}$ at a lattice point Q43, and the like.

Furthermore, as is the case with Exemplary Embodiment 1, a general supplementary condition is that the second differential parameter y" at the end point is zero.

The description of the above-described second condition will be supplemented. The spline function is defined for a direction 1 (one of b and K illustrated in FIG. 11), and for an independent variable identified by j in a direction 2 and an adjacent independent variable identified by j+1, a difference between the corresponding second differential parameters is represented by Equation (12):

$$y''{}_j^{(1)} - y''{}_{j+1}^{(1)} = A^{(1)-1} B^{(1)} (y_j^{(1)} - y_{j+1}^{(1)}) \qquad (12)$$

where the definition of the spline function for the direction 1 is indicated by a superscript (1). The matrix A and the matrix B may be defined as is the case with Equation (5) and Equation (6).

For j=0 to $n_2-2$, an equation similar to Equation (12) is satisfied, and a matrix $C^{(1)}$ of Equation (13) is defined.

[Mathematical Equation 2]

$$\begin{bmatrix} y_0''^{(1)} - y_1''^{(1)} \\ \vdots \\ y_j''^{(1)} - y_{j+1}''^{(1)} \\ \vdots \\ y_{n_2-2}''^{(1)} - y_{n_2-1}''^{(1)} \end{bmatrix} = C_u^{(1)} y_u^{(1)} + C_k^{(1)} y_k^{(1)} \quad (13)$$

From above, Equation (14) below is established.

[Mathematical Equation 3]

$$\begin{bmatrix} y_0''^{(1)} - y_1''^{(1)} \\ \vdots \\ y_j''^{(1)} - y_{j+1}''^{(1)} \\ \vdots \\ y_{n_2-2}''^{(1)} - y_{n_2-1}''^{(1)} \end{bmatrix} = C^{(1)} y^{(1)} \quad (14)$$

In Equation (14), when known elements are collectively represented as $y_k$, unknown elements are collectively represented as $y_u$, and corresponding column elements in the matrix C are represented as $C_k$ and $C_u$, respectively, Equation (15) below is obtained.

[Mathematical Equation 4]

$$\begin{bmatrix} y_0''^{(1)} - y_1''^{(1)} \\ \vdots \\ y_j''^{(1)} - y_{j+1}''^{(1)} \\ \vdots \\ y_{n_2-2}''^{(1)} - y_{n_2-1}''^{(1)} \end{bmatrix} = C_u^{(1)} y_u^{(1)} + C_k^{(1)} y_k^{(1)} \quad (15)$$

An objective function for the direction 1 in Exemplary Embodiment 2 is obtained by squaring Equation (15) as is the case with Equation (8) (Equation (16)), and the entire objective function in Exemplary Embodiment 2 is obtained by adding, to the obtained objective function for the direction 1, an objective function for the direction 2 defined similarly to the objective function for the direction 1.

[Mathematical Equation 5]

$$E = \begin{bmatrix} y_0''^{(1)} - y_1''^{(1)} \\ y_j''^{(1)} - y_{j+1}''^{(1)} \\ y_{n_2-2}''^{(1)} - y_{n_2-1}''^{(1)} \end{bmatrix}^T \begin{bmatrix} y_0''^{(1)} - y_1''^{(1)} \\ y_j''^{(1)} - y_{j+1}''^{(1)} \\ y_{n_2-2}''^{(1)} - y_{n_2-1}''^{(1)} \end{bmatrix} \quad (16)$$

For simplification, Exemplary Embodiment 2 has been described as in the case where the values are two-dimensional as schematically described in FIG. 11. However, an objective function for the supplementation step for deficient data in Exemplary Embodiment 2 is defined by expanding the above-described technique to four dimensions. The deficient data is found by obtaining the unknown elements $y_u$ (deficient input values) in such a manner as to minimize the objective function as defined above.

According to Exemplary Embodiment 2, as described with reference to FIG. 9, the color correction table 22 is created to make the input value and the output value as close as possible. This enables a reduction in change in device-dependent value resulting from correction, and is suitably effective for substantially matching curved surface formations in adjacent directions with each other as described with reference to FIG. 11.

Exemplary Embodiment 3 will be described. According to Exemplary Embodiment 3, by taking into account a case where the A2B table is created using a colorimetric apparatus (hereinafter referred to as a reference colorimetric apparatus) different from the colorimetric apparatus 35 mounted in the printing apparatus 30, possible errors resulting from the use of the different colorimetric apparatus are prevented.

Figure 12:
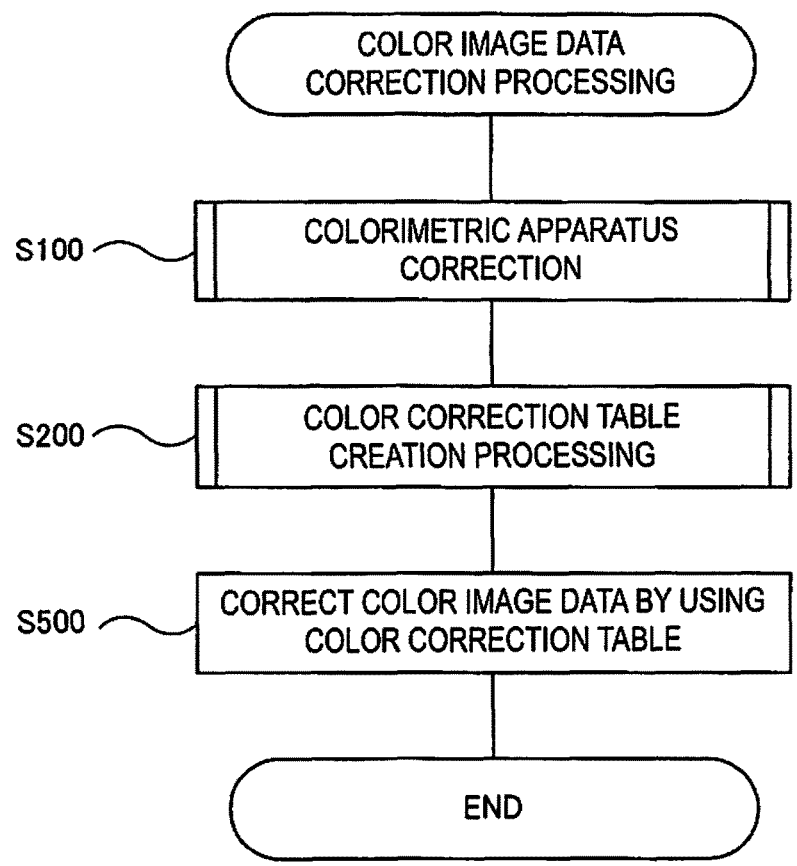
FIG. 12 is a flowchart illustrating color image data correction processing (Exemplary Embodiment 3).

Description of Exemplary Embodiment 3 is mainly directed to differences from Exemplary Embodiment 1. FIG. 12 is a flowchart illustrating the color image data correction processing according to Exemplary Embodiment 3. In Exemplary Embodiment 3, first, the colorimetric apparatus correction processing is executed (S100) (colorimetric apparatus correction step).

Figure 13:
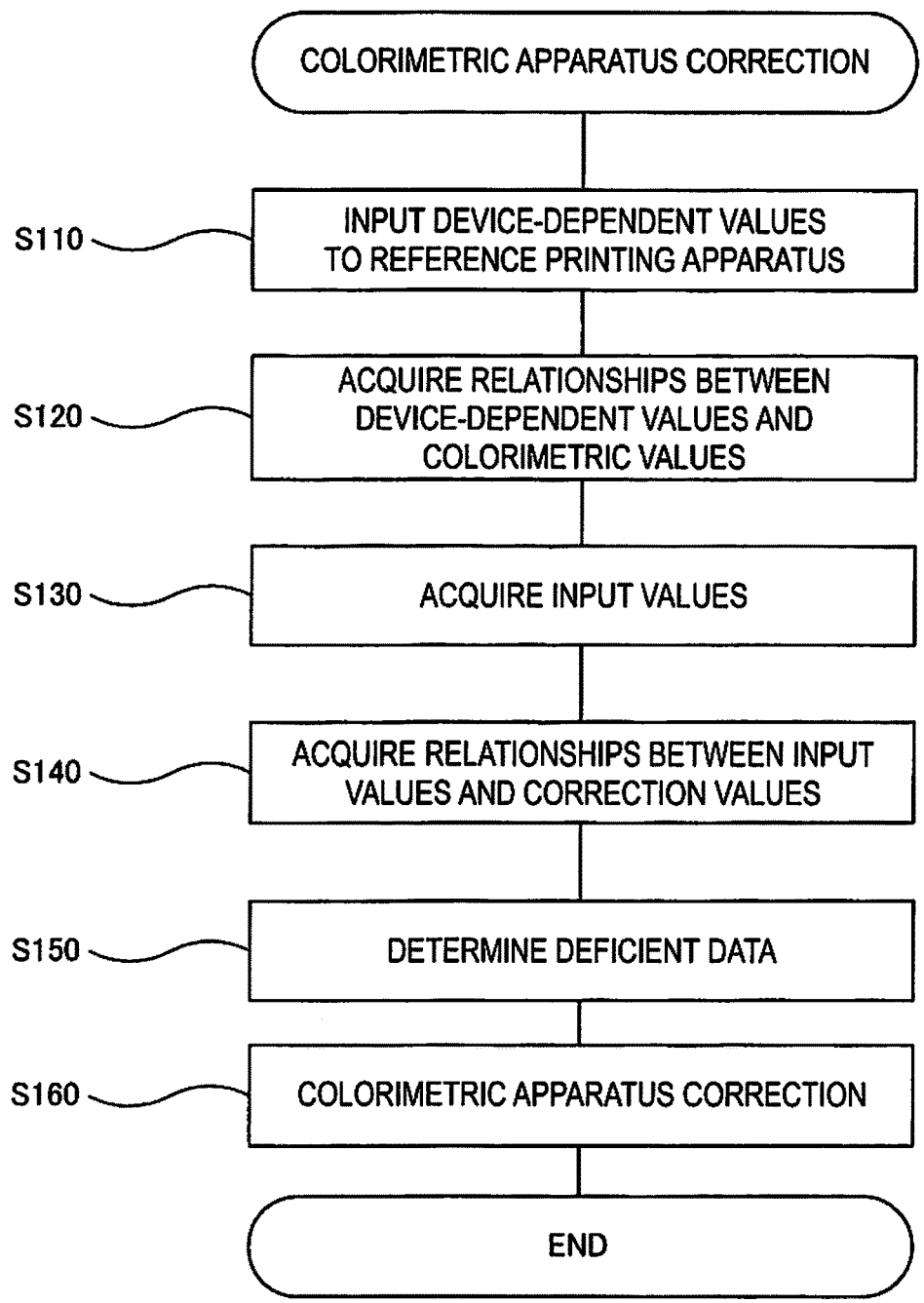
FIG. 13 is a flowchart illustrating colorimetric apparatus correction processing.

FIG. 13 is a flowchart illustrating colorimetric apparatus correction processing. First, device-dependent values are input to the reference printing apparatus (S110). The device-dependent values input in S110 are the same as the values input in S210. When the device-dependent values are input to the reference printing apparatus, the reference printing apparatus prints a patch in accordance with the input values.

Then, the colorimetric apparatus 35 of the printing apparatus 30 executes colorimetric processing on the patch printed in S110 (hereinafter referred to as the reference patch) (S120). In other words, a user carries the reference patch from the reference printing apparatus to the printing apparatus 30 and then activates the colorimetric apparatus 35 of the printing apparatus 30 to execute colorimetric processing.

Then, based on colorimetric results obtained in S120, input values are acquired (S130). S130 is executed similarly to S230. The input values obtained in this step correspond to the device-dependent values input to the reference colorimetric apparatus.

Then, relationships between the input values and correction values for the reference patch are acquired (S140). The correction values in S140 correspond to the device-dependent values input to the colorimetric apparatus 35. Furthermore, in S140, processing similar to the processing in S240 in Exemplary Embodiment 1 is executed.

Subsequently, deficient data is determined (S150). S150 is executed similarly to S250 described in Exemplary Embodiment 1.

Figure 14:
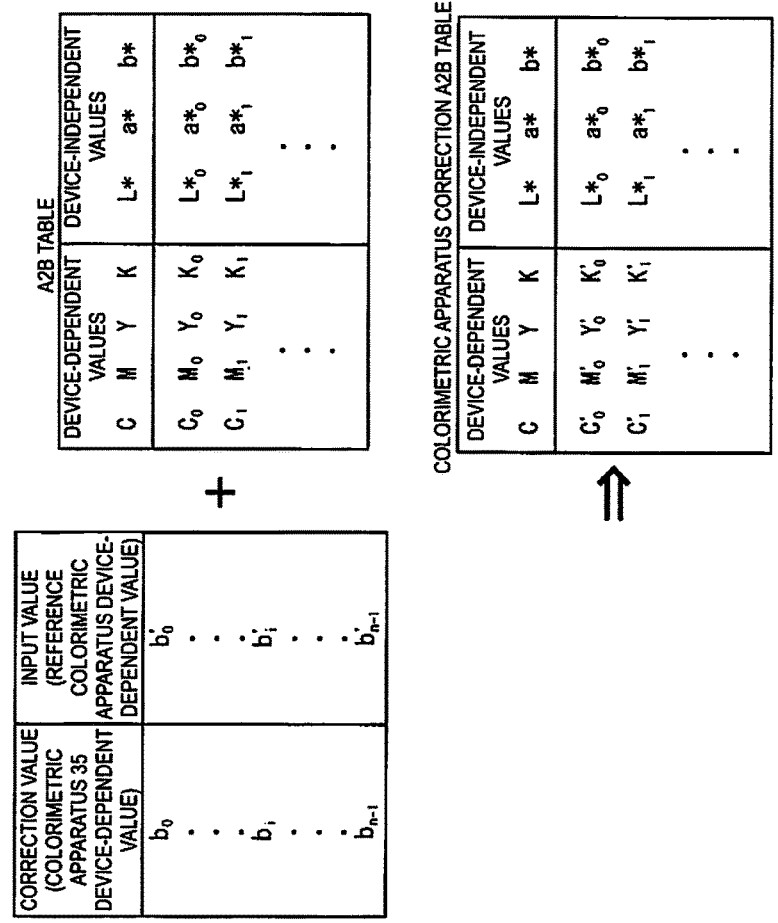
FIG. 14 is a diagram for describing colorimetric apparatus correction for an A2B table.

The colorimetric apparatus correction is performed using a color correction table created beforehand (S160). In the colorimetric apparatus correction, the A2B table is generated as a colorimetric apparatus correction A2B table using correspondence relationships created in S150 and conversion illustrated in FIG. 14. As seen in FIG. 14, the colorimetric apparatus correction A2B table is obtained as, from the correspondence relationships between the correction values obtained in S150 (device-dependent values corresponding to the colorimetric apparatus 35) and the input values (device-dependent values corresponding to the reference colorimetric apparatus), and the above-described A2B table, the correspondence relationships between the correction values (device-dependent values corresponding to the colorimetric apparatus 35) and color values. The thus created colorimetric apparatus correction A2B table is utilized for the color correction table creation processing (S200).

The color correction table creation processing in Exemplary Embodiment 3 is different, in S230, from the color correction table creation processing in Exemplary Embodiment 1. This will be described with reference to FIG. 15.

Figure 15:
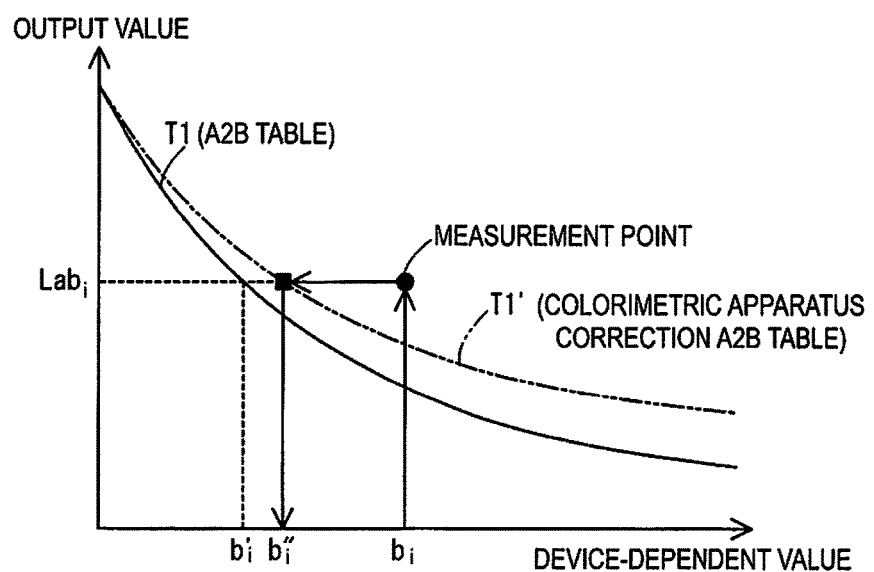
FIG. 15 is a graph illustrating relationships between output values and device-dependent values (Exemplary Embodiment 3).

FIG. 15 is a graph illustrating the relationships between the output values and the device-dependent values. As illustrated in FIG. 15, in Exemplary Embodiment 3, for the correction value $b_i$, a device-dependent value $b''_i$ is acquired as an input value $b''_i$ instead of the device-dependent value $b'_i$ (S230). The input value $b''_i$ is a value of the horizontal axis for an intersection point between a relationship T1' and the output value $Lab_i$.

The relationship T1' corresponds to the colorimetric apparatus correction A2B table obtained in S100. A deviation between the relationship T1' and the relationship T1 is a deviation caused due to the reference colorimetric apparatus and the colorimetric apparatus 35. This is because the reference patch is printed by the reference printing apparatus and thus involves no deviation of the output value. Therefore, a possible deviation between the relationship T1' and the relationship T1 is caused by a measurement error in the colorimetric apparatus 35 of the printing apparatus 30.

Furthermore, the color values acquired in S220 (output value acquisition step) in the present embodiment result from the colorimetric processing using the colorimetric apparatus 35 instead of the reference colorimetric apparatus. Thus, in S230, the input values are acquired using, instead of the relationship T1, the relationship T1' (the colorimetric apparatus correction A2B table), resulting from the correction based on the assumption of the acquisition using the colorimetric apparatus 35.

Exemplary Embodiment 3 described above allows the color image data to be corrected taking into account errors between the colorimetric apparatus 35 and the reference colorimetric apparatus.

The present invention is not limited to the exemplary embodiments, examples, and modified examples described herein, but may be implemented in various configurations without departing from the spirits of the present invention. For example, appropriate replacements or combinations may be made to the technical features in the exemplary embodiments, examples, and modified examples which correspond to the technical features in the aspects described in the Summary of Invention section to achieve a part or all of the above-described advantage or to achieve a part or all of the above-described advantageous effects. Any of the technical features may be deleted as appropriate unless the technical feature is described as indispensable. For example, the following modifications may be made.

In a case of determination of deficient data, any parameter other than the second differential parameter may be taken into account. For example, the deficient data may be determined in such a manner as to minimize the square sum of primary differential parameters.

The colors constituting the device-dependent values may be changed. For example, the device-dependent values may be configured to include a specific color such as red or green in addition to CMY (or RGB) or CMYK.

A configuration may be adopted that uses an independent colorimetric apparatus that is not built into the printing apparatus.

In the above-described exemplary embodiments, a part or all of the functions and processing implemented by software may be implemented by hardware. Furthermore, a part or all of the functions and processing implemented by hardware may be implemented by software. The hardware may be, for example, any of various circuits such as an integrated circuit, a discrete circuit, or a circuit module with a combination of integrated circuits or discrete circuits.

REFERENCE SIGNS LIST

20 . . . Color image data correction apparatus, 22 . . . Color correction table, 25 . . . A2B table, 30 . . . Printing apparatus, 35 . . . Colorimetric apparatus, 50 . . . Printing system

The invention claimed is:

1. A color correction table creation method for creating a color correction table for correcting a device-dependent value used as printing data to be input to a printing apparatus, the color correction table creation method comprising:
   an output value acquisition step of acquiring, as an output value, a colorimetric result for a printed matter created by inputting a specific device-dependent value to the printing apparatus;
   an input value acquisition step of acquiring, as an input value for the color correction, a device-dependent value for a printed matter created by a reference printing apparatus to achieve the output value acquired;
   a correction value acquisition step of acquiring the specific device-dependent value as a correction value corresponding to the input value;
   a creation step of creating the color correction table utilizing a relationship between the input value and the correction value; and
   a supplementation step of supplementing the relationship between the input value and the correction value, wherein
   in the creation step, the correction value is determined by utilizing a result of the supplementation for at least some of a plurality of the input values to be stored in the color correction table, and
   in the supplementation step, a spline function is used.

2. The color correction table creation method according to claim 1, wherein
   the input value is determined to minimize a sum of squares of second differential parameters at lattice points of a cubic spline function used in the supplementation step.

3. The color correction table creation method according to claim 1, wherein
   the cubic spline function used in the supplementation step includes first to n-th spline functions, n being an integer of 2 or greater, respectively defined by first to n-th directions orthogonal to one another, and
   the input value is determined to minimize a value of a sum acquired by calculating and summing, for combinations for the first to n-th directions and for all the lattice points, a square of a difference between a second differential parameter at a certain lattice point of the spline function for an m-th, m being any one of integers of 1 to n, direction and a second differential spline parameter at an adjacent lattice point of another spline function for the m-th direction, the another spline function for the m-th direction passing through the adjacent lattice point that is adjacent to the certain lattice point in a direction orthogonal to the m-th direction.

4. The color correction table creation method according to claim 1, wherein
the device-dependent value used as the printing data is defined to be n-dimensional, n being an integer of 2 or greater, and
in the input value acquisition step, among candidates for the input value, a value with a shortest distance to the specific device-dependent value in the n-dimensional space is acquired as the input value.

5. The color correction table creation method according to claim 1, further comprising:
a colorimetric apparatus correction step of correcting a deviation between a characteristic of the reference colorimetric apparatus and a characteristic of a colorimetric apparatus used for colorimetric processing on the printed matter in the input value acquisition step, wherein
in the input value acquisition step, the input value is acquired using a correspondence relationship between the device-dependent value and the output value acquired in the colorimetric apparatus correction step.

6. A color correction table creation apparatus for creating a color correction table for correcting a device-dependent value used as printing data to be input to a printing apparatus, wherein the color correction table creation apparatus is configured to execute,
an output value acquisition step of acquiring, as an output value, a colorimetric result for a printed matter created by inputting a specific device-dependent value to the printing apparatus;
an input value acquisition step of acquiring, as an input value for the color correction, a device-dependent value for a printed matter created by a reference printing apparatus to achieve the output value acquired;
a correction value acquisition step of acquiring the specific device-dependent value as a correction value corresponding to the input value;
a creation step of creating the color correction table utilizing a relationship between the input value and the correction value; and
a supplementation step of supplementing the relationship between the input value and the correction value, wherein
in the creation step, the correction value is determined by utilizing a result of the supplementation for at least some of a plurality of input values to be stored in the color correction table, and
in the supplementation step, a spline function is used.

7. A non-transitory computer readable medium for storing program for creating a color correction table for correcting a device-dependent value used as printing data to be input to a printing apparatus, wherein the program causes a computer to execute,
an output value acquisition step of acquiring, as an output value, a colorimetric result for a printed matter created by inputting a specific device-dependent value to the printing apparatus;
an input value acquisition step of acquiring, as an input value for the color correction, a device-dependent value for a printed matter created by a reference printing apparatus to achieve the output value acquired;
a correction value acquisition step of acquiring the specific device-dependent value as a correction value corresponding to the input value;
a creation step of creating the color correction table utilizing a relationship between the input value and the correction value; and
a supplementation step of supplementing the relationship between the input value and the correction value, wherein
in the creation step, the correction value is determined by utilizing a result of the supplementation for at least some of a plurality of input values to be stored in the color correction table, and
in the supplementation step, a spline function is used.

* * * * *